(12) United States Patent
Kenworthy

(10) Patent No.: US 8,398,119 B2
(45) Date of Patent: Mar. 19, 2013

(54) ELECTROFUSION FITTING

(75) Inventor: David Michael Anthony Kenworthy, Dronfield Woodhouse (GB)

(73) Assignee: Pioneer Lining Technology Limited, Queens Quay, Clydebank (GB)

( * ) Notice: Subject to any disclaimer, the term of this patent is extended or adjusted under 35 U.S.C. 154(b) by 203 days.

(21) Appl. No.: 13/122,746

(22) PCT Filed: Oct. 8, 2009

(86) PCT No.: PCT/GB2009/002405
§ 371 (c)(1), (2), (4) Date: Apr. 6, 2011

(87) PCT Pub. No.: WO2010/041016
PCT Pub. Date: Apr. 15, 2010

(65) Prior Publication Data
US 2011/0193339 A1   Aug. 11, 2011

(30) Foreign Application Priority Data
Oct. 11, 2008   (GB) .................................. 0818693.4

(51) Int. Cl.
*F16L 13/02*   (2006.01)
(52) U.S. Cl. ....... 285/21.2; 285/370; 285/397; 219/535; 219/541

(58) Field of Classification Search ................. 285/21.1, 285/21.2, 285.1, 397, 370; 219/535, 59.1, 219/544, 541, 547
See application file for complete search history.

(56) References Cited

U.S. PATENT DOCUMENTS

| 2,423,848 | A | * | 7/1947 | O'Connor ...................... 33/613 |
| 5,685,572 | A | * | 11/1997 | Linton et al. .................. 285/21.2 |
| 5,779,843 | A | * | 7/1998 | Kumagai et al. ........... 156/274.2 |
| 5,984,370 | A | * | 11/1999 | Lewis ............................. 285/22 |

FOREIGN PATENT DOCUMENTS

| EP | 0366299 | 5/1990 |
| EP | 0722824 | 7/1996 |
| JP | 5305669 | 11/1993 |

* cited by examiner

*Primary Examiner* — Aaron Dunwoody
(74) *Attorney, Agent, or Firm* — King & Schickli, PLLC

(57) ABSTRACT

An electrofusion fitting includes a tubular length of thermoplastic material, of an outer diameter commensurate with the inner diameter of the ends of a compatible thermoplastic material lining of adjacent lengths of metal pipe, there being at each end of the fitting at least two heater coils on or in close proximity to the outer surface of the fitting, electrical leads from the heater coils extending through the fitting to emerge at the inner surface of the tubular length, for connection to a source of electrical power.

16 Claims, 3 Drawing Sheets

ELECTROFUSION FITTING

This application is the national stage of PCT/GB2009/002405, filed Oct. 8, 2009, which claims priority from British Patent Application Ser. No. 0818693.4, filed Oct. 11, 2008, the disclosures of which are incorporated herein by reference.

FIELD OF THE INVENTION

This invention relates to electrofusion fittings, to a method of forming a pipe joint incorporating such fittings and to pipe joints incorporating such fittings.

BACKGROUND OF THE INVENTION

In the conveying of liquids and gases by pipelines, particularly when the liquids or gases are corrosive, it is known to provide lengths of metal pipe each lined with suitable plastics material, such as for example a polymer, to provide a corrosion resistance. To join adjacent lined pipe lengths, it is known to weld together the adjacent ends of the outer metal pipe lengths, and connect the inner plastics linings by an electrofusion technique.

Such an arrangement is illustrated and described in British Patent Publication No. 2979135 where a tubular electrofusion fitting is provided on a metal inner supporting ring, and is inserted into the adjacent ends of two lined pipe lengths, the electrofusion fitting having heating coils in or adjacent its outer surface one to each end of the fitting with electrical leads overlying the fitting to be taken through the gap between the adjacent outer metal pipe lengths and to a source of electrical power. After heating the coils to melt the interface between the fitting and the inner plastics lining of the pipe lengths, to create an electrofused joint, the electrical leads are cut back close to the outer metal pipe lengths, which are then welded together, with the inevitable incorporation of the electrical lead ends in the weld and which contaminates the weld.

Contamination of the weld between the adjacent ends of the outer metal pipe lengths can have serious consequences, particularly when the pipe line is to be laid in the sea, and it is not unknown for such welded joints to fail as a consequence of the contamination of the weld.

In addition to weld contamination, it is known for the electrofused joint between the fitting and the lining of the pipe to fail as a consequence of heating wire movement during the heating phase. Such joints are not easy to test before a pipeline is put into service and should it be that the electrofused joint is compromised and fails in use, serious consequences can arise, particularly if the pipeline is in a sub-sea application where repair or replacement costs would be excessive.

SUMMARY OF THE INVENTION

A first object of the invention is to provide an improved electrofusion fitting where the problems mentioned above are avoided. Second and third objects of the invention are to provide a method of forming a pipe joint in which the above mentioned problems are avoided, and to provide a pipe joint when made by the method.

According to a first aspect of the invention, an electrofusion fitting comprises a tubular length of thermoplastic material, of an outer diameter commensurate with the inner diameter of the ends of a compatible thermoplastic material lining of adjacent lengths of metal pipe, there being at each end of the fitting at least two heater coils on or in close proximity to the outer surface of the fitting, electrical leads from the heater coils extending through the fitting to emerge at the inner surface of the tubular length, for connection to a source of electrical power.

The electrical leads may be of a length to allow them to be carried through a pipe length and connected to a source of electrical power. However, it is preferred to provide electrodes on the inner surface of the tubular fitting to which the electrical leads are connected and to which a source of electrical power can be connected, and further preferably the electrodes at the ends of the electrical leads are sited between the positions of the adjacent ends of the co-operating heater coils, at each end of the tubular length. The electrodes on the inner surface of the electrofusion fitting may be such as to provide point contact, but preferably are such as to allow manual attachment of electrical leads to a source of electrical power.

The ends of the tubular fitting may be straight to be a close sliding fit in the ends of or the counterbored ends of adjacent lined pipe lengths, but preferably, the ends of the fitting and the co-operating ends of the linings of the pipe lengths are equally tapered, such that the fitting can be pushed into contact with the ends of the linings of the pipe lengths.

By taking the connecting leads for the coils through the fitting to emerge inwardly of the tubular length, the need to take the leads through the gap between adjacent pipe ends is avoided, and a serious source of weld contamination is thereby eliminated. In addition to this, by having at least two separate heating coils at each end of the fitting, two electrofused joints are provided between each end of the fitting and the linings of the respective pipes to which the fitting is applied. The prospect of both joints to one side of the fitting being compromised and failing is sufficiently remote for the integrity of the joint to be guaranteed to a substantial degree. Still further insurance for the integrity of the joint can be provided by having sealing rings located to one side of one innermost coil and the opposite side of the second or outermost coil, to both sides of the fitting.

Preferably, there is, generally centrally of the fitting, a recess in its outer surface for the location of insulating material such as for example a ceramic ring to be overlaid by the ends of the adjacent pipe lengths bridged by the fitting and from where the pipe lining is cut back. Thus, at the point where the outer metal pipes are welded together, the insulating material acts as a thermal barrier, to prevent the softening or melting of the fitting below the position of the weld.

Particularly when relatively thin walled tubular fitting is employed, there is an advisability in ensuring that when the material of the fitting is melted to bring about fusion of the fitting with the lining of the pipe, it does not sag or collapse into the fitting. Therefore, a support ring may be provided below each coil of the fitting, of a material of a higher melting point than that of the fitting. Such support rings may be inserted into the fitting and located where required, or may be moulded into the fitting during the moulding of the fitting.

Whilst such support rings may remain permanently in the fitting after electrofusion has taken place, it is equally so that the support rings are mandrels and removed from the fitting after the fusion stage.

According to a second aspect of the invention a method of forming a joint between two metal pipe lengths each provided with an inner lining of a thermoplastics material, comprises inserting into the one pipe length one end of an electrofusion sleeve with support rings as is defined above, attaching electrical leads to the electrodes of the coils on the electrofusion sleeve at the end inserted into the pipe end, connecting the leads to a source of electrical power to heat the coils at that end of the electrofusion sleeve to fuse the sleeve to the lining of the pipe, detaching the electrical leads from the electrodes, attaching electrical leads to the electrodes at the opposite end of the electrofusion sleeve, positioning the opposite end of the electrofusion sleeve in the end of a second pipe length, passing the electrical leads along the pipe length, connecting the leads to a source of electrical power to heat the coils at the opposite end of the electrofusion sleeve to fuse the sleeve to the lining of the second pipe length, pulling the electrical leads from the electrodes and removing the leads from within the second pipe, and welding the adjacent ends of the metal pipes.

According to a third aspect of the invention, a method of forming a joint between two metal pipe lengths each provided with an inner lining of a thermoplastics material, comprises inserting into the end of one pipe length one end of an electrofusion fitting as is defined above, introducing into the fitting an expandable mandrel having one or more electrodes on its surface, positioning a mandrel below the heating coils at the said one end of the fitting, expanding the mandrel into contact with the inner surface of the fitting to support the fitting and put the electrodes on the mandrel into contact with the electrodes on the inner surface of the fitting at that side, connecting the electrodes on the mandrel to a source of electrical power, to provide power to heat the at least two coils at the said one end of the fitting, to create at least two electrofused joints between the said one end of the fitting and the thermoplastics lining, locating an expandable mandrel having one or more electrodes on its surface at a position below the other side of the fitting, expanding the mandrel to support the fitting and put the electrodes on the mandrel into contact with the electrodes on the fitting at that side, positioning the fitting in the end of a second pipe length, connecting the electrodes on the mandrel to a source of electrical power to heat the at least two coils at the second end of the fitting to create at least two electrofused joints between the second end of the fitting and the thermoplastics lining of the co-operating lined pipe length, collapsing and withdrawing the mandrel and welding together the adjacent ends of the outer metal pipe lengths.

Whilst separate mandrels may be provided, each of a design that allows them to be left in situ after welding has taken place and serve as support rings, it may also be so that collapsible and removable mandrels can be used, and this facilitates the use of one mandrel, that can first be collapsed and inserted into the tubular length, and expanded into contact with the inner surface of the tubular fitting, and following welding at that side, the mandrel can be collapsed and withdrawn, and inserted into the other end of the tubular fitting, and re-expanded into contact with the inner surface of the tubular fitting at the end, to facilitate welding at that end, without the risk of collapse of the tubular fitting, followed by collapsing the mandrel again, and withdrawing it from the tubular fitting.

Preferably, adjacent ends of lined pipe lengths have part of the lining removed to expose the metal pipe, the fitting has a central recess in which insulating material is placed to be overlaid by the exposed ends, and the metal pipes are welded together, thereby avoiding the possibility of softening or melting of the fitting below the position of the weld.

In addition to providing for the supply of electrical power to the coils on the fittings and providing a physical support for the fitting during the electrofusion stage, support rings or the mandrel may also serve as a heat sink, thereby ensuring not only the maintaining of the fitting in place but also the prevention of any melting of the fitting except at its interface with the associated pipe linings.

The electrodes on the inner surface of the fitting and on the mandrel may be such as to require point contact, with a consequent need for careful location of the mandrel into the fitting and of orienting the mandrel to ensure that its electrodes are aligned with those on the fitting. Alternatively, the electrodes on the mandrel may be elongate or circular around the periphery of the mandrel, thereby avoiding the need to orient the mandrel, leaving only the need for careful positioning of the mandrel within the fitting.

The invention also extends to a joint between adjacent lined pipe ends when incorporating an electrofusion fitting as defined by the first aspect of the invention, and when produced by the method defined by the second aspect of the invention.

BRIEF DESCRIPTION OF THE DRAWING FIGURES

Two embodiments of the invention will now be described with reference to the accompanying drawings in which.

DETAILED DESCRIPTION OF THE INVENTION

Figure 1:
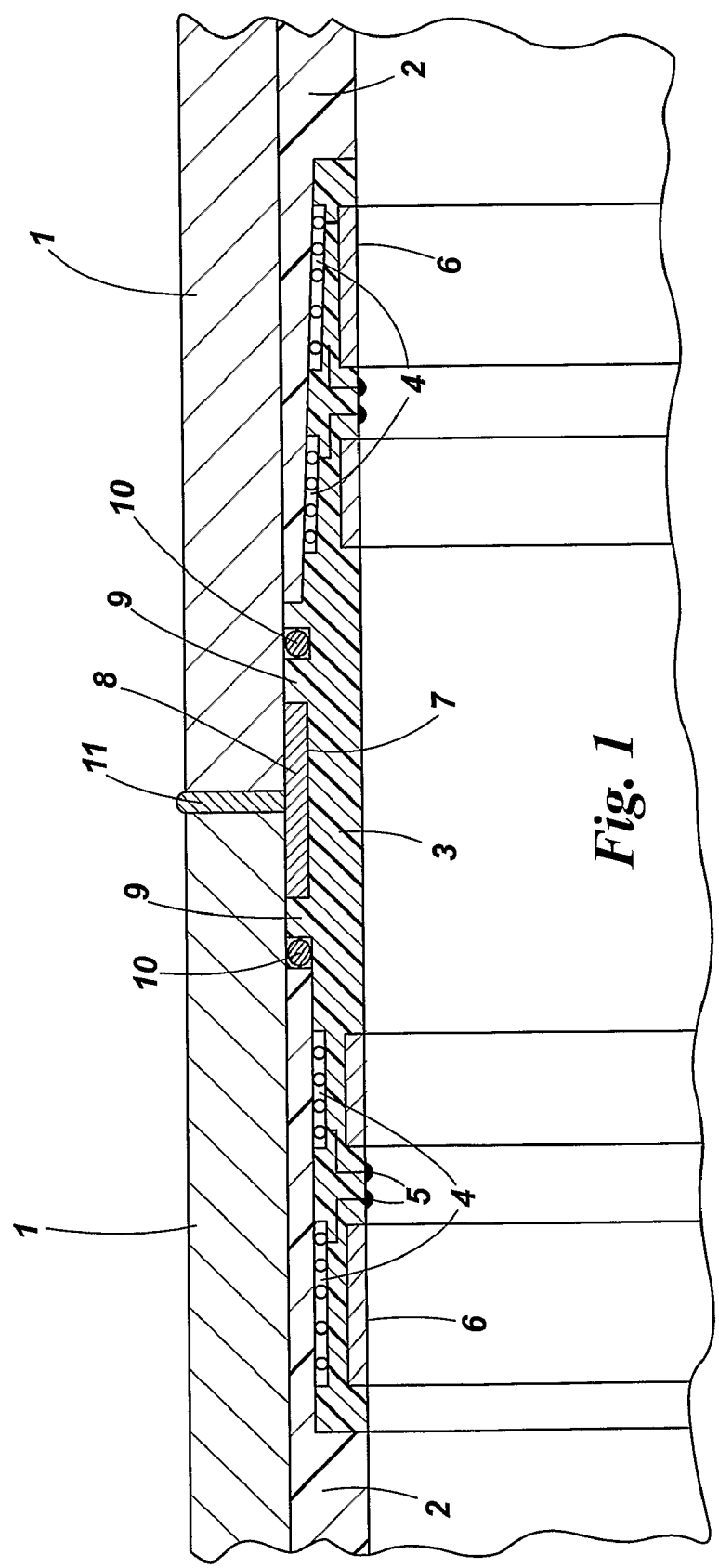
FIG. 1 is a schematic sectional view of a part of adjacent pipe ends and a first embodiment of electrofusion fitting.

In FIG. 1, a joint between adjacent ends of metal pipe lengths 1 is illustrated, the pipe lengths having a lining 2 of a thermoplastics material. Bridging the adjacent ends of the pipe lengths is an electrofusion sleeve 3 supporting two heating coils 4 towards each end of the sleeve. The electrofusion sleeve may have a straight end section bearing the heater coils, as is illustrated to the left hand side of FIG. 1, or it may have a tapered section bearing the heater coils as is illustrated to the right hand side of FIG. 1. Electrical leads for each coil are embedded in the sleeve 3 and emerge on the inner surface of the sleeve at a position between the adjacent ends of the heating coils to that side, and each lead is provided with a terminal 5. Positioned on the inner wall of the electrofusion sleeve, and in alignment with a respective heater coil, is a support ring 6.

Centrally of the electrofusion sleeve is a recess 7 in which is fitted such as a ceramic ring 8, and the electrofusion sleeve is provided with an abutment 9 so positioned that a gap is provided between the abutment and the end of the inner lining in which is fitted a sealing ring 10.

Thus, two pipe lengths with prepared ends has the inner lining stripped back to a predetermined degree, and the electrofusion sleeve 3 with a fitted sealing ring 10 inserted into the end of one of the pipes, following which, electrical leads are connected to the electrodes 5 at the inserted end of the sleeve, brought out of the sleeve and connected to a source of electrical power to melt the sleeve and the lining in the vicinity of the coils and fuse the sleeve to the pipe lining. The leads are then removed from the electrodes 5, and they, or new, leads connected to the electrodes at the opposite end of the sleeve. A second pipe is fitted on to the opposite end of the sleeve, and the electrical leads passed along its length, for connection to a source of electrical power to heat the coils at the opposite end of the sleeve, to fuse the sleeve to the lining of the second pipe, following which the electrical leads can be pulled from the electrodes 5 and out of the second pipe length. The ends of the pipes are then welded at 11.

The provision of support rings 6 below each coil 4, of a material of a higher melting point than that of the sleeve 3 and lining 2 ensures that there is no collapse of the sleeve below the coils during the electrofusion stage.

Figure 2:
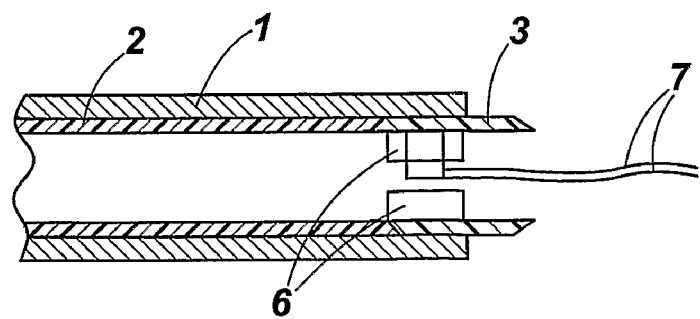
FIGS. 2 to 4 are schematic representations of a second embodiment of electrofusion fitting and its method of jointing.
Figure 3:
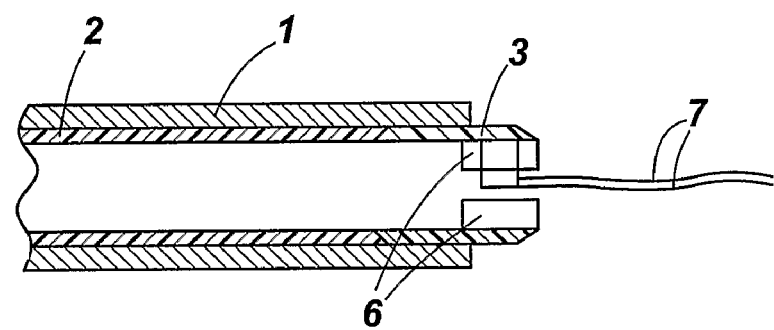
Figure 4:
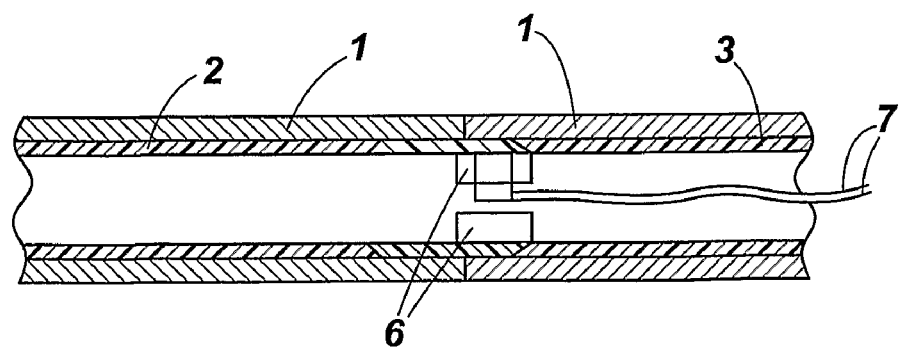

As an alternative to the use of support rings 6, a mandrel can be used. Thus, and as is illustrated schematically in FIGS. 2 to 4, the electrofusion sleeve of FIG. 1 can be inserted into the end of a first pipe 1 and a mandrel 12 introduced into the electrofusion sleeve 3. The mandrel has electrodes (not shown) to make contact with the electrodes 5 on the sleeve, and electrical leads 13. With the mandrel located as indicated in FIG. 2, electrofusion of the sleeve 3 to the lining 2 can be effected, and the mandrel relocated below the coils to the opposite end of the electrofusion sleeve. The second pipe 1 can then be fitting to the electrofusion sleeve as indicated in FIG. 3, to allow the welding of the pipe ends as is discussed in relation to FIG. 1, and then power supplied to the electrodes on the mandrel to bring about electrofusing of the sleeve 3 to the lining 2 of the second pipe length, following which the mandrel is pulled clear of the second pipe length.

Figure 5:
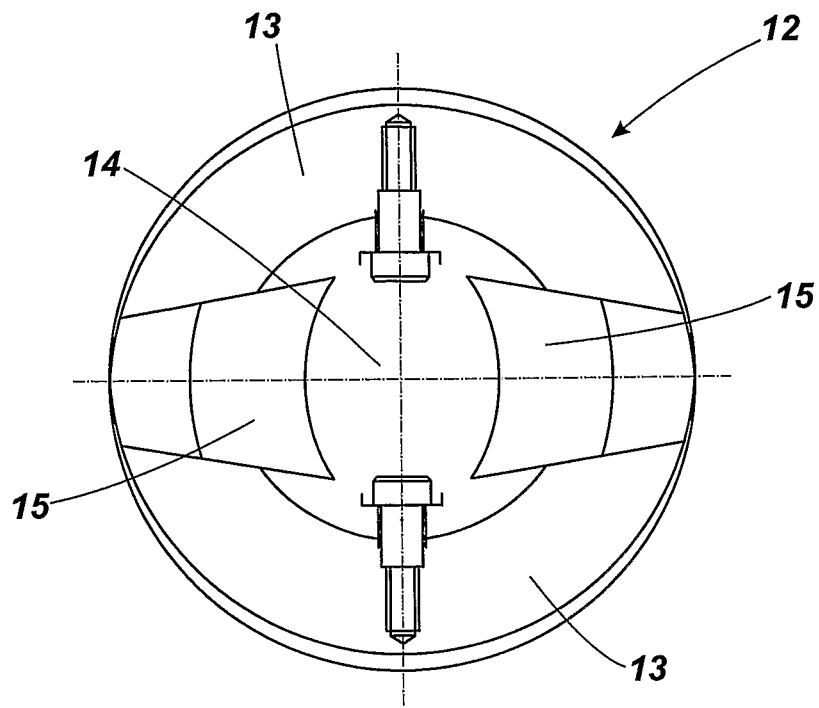
FIGS. 5 and 6 are schematic elevations of an expandable mandrel for use as is indicated in FIGS. 2 to 4.
Figure 6:
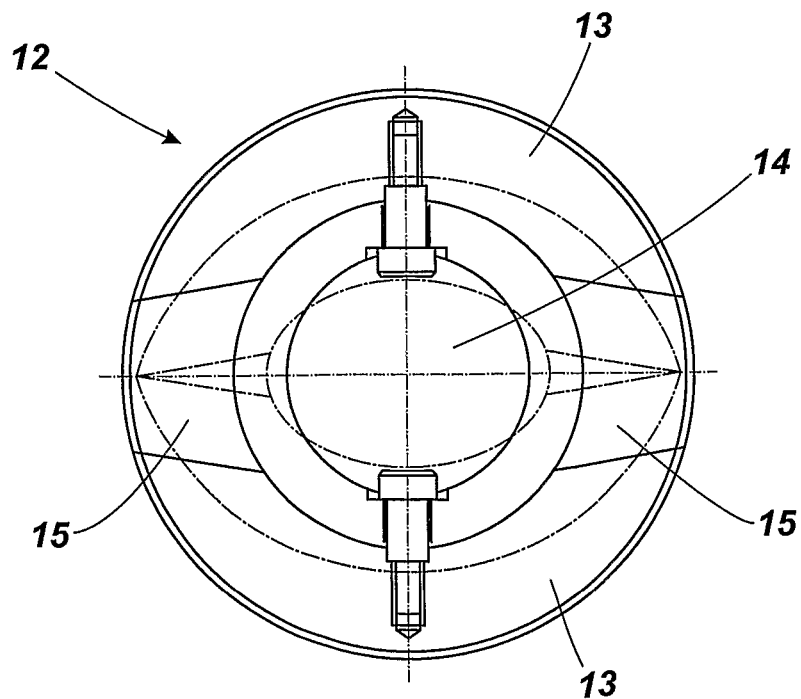

Whilst the mandrel could be a push/sliding fit in the electrofusion sleeve, it would be advisable for the mandrel to be expandable and collapsible. An example of such a mandrel is illustrated in FIGS. 5 and 6, where a mandrel with two opposed parts 13 that are in constrained but sliding relationship have a central area 14 in which an expanding mechanism can be fitted, such as for example a screw or a hydraulic cylinder and piston attached to opposed wedge members 15 between the parts 14. This enables the wedges to be withdrawn to cause a contraction of the mandrel or urged outwardly to cause an expansion of the mandrel, dependent on the mandrel being required to be passed along a pipe length, or deployed at a required location within the electrofusion fitting. Although not illustrated, it will be understood that electrodes can be fixed in strategic positions on the parts 14 to allow contact with the electrodes 5 on the electrofusion sleeve, when the mandrel is deployed, to bring about the welding stage and provide physical support below the positions of the coils 4.

The invention claimed is:

1. An electrofusion fitting comprising a tubular length of thermoplastic material, of an outer diameter commensurate with the inner diameter of the ends of a compatible thermoplastic material lining of adjacent lengths of metal pipe, there being at each end of the fitting at least two heater coils on or in close proximity to the outer surface of the fitting, electrical leads from the heater coils extending through the fitting to emerge at the inner surface of the tubular length, for connection to a source of electrical power.

2. An electrofusion fitting as in claim 1, wherein the electrical leads are of a length to allow them to be carried through a pipe length and connected to a source of electrical power.

3. An electrofusion fitting as in claim 1, wherein electrodes are provided on the inner surface of the tubular fitting to which the electrical leads are connected and to which a source of electrical power can be connected.

4. An electrofusion fitting as in claim 3, wherein the electrodes at the ends of the electrical leads are sited between the positions of the adjacent ends of the co-operating heater coils, at each end of the tubular length.

5. An electrofusion fitting as in claim 4, wherein the electrodes are such as to allow the manual attachment of electrical leads to an appropriate source of electrical power.

6. An electrofusion fitting as in claim 1, wherein the ends of the tubular fitting are straight to be a close sliding fit in the ends of or the counterbored ends of adjacent lined pipe lengths.

7. An electrofusion fitting as in claim 1, wherein the ends of the fitting and the co-operating ends of the linings of the pipe lengths are equally tapered, such that the fitting can be pushed into contact with the ends of the linings of the pipe lengths.

8. An electrofusion fitting as in claim 1, wherein there is, generally centrally of the fitting, a recess in its outer surface for the location of insulating material to be overlaid by the ends of the adjacent pipe lengths bridged by the fitting and from where the pipe lining is cut back.

9. An electrofusion fitting as in claim 8, wherein the insulating material is a ceramic ring.

10. An electrofusion fitting as in claim 1, wherein a supporting ring is provided below each coil of the fitting, of a material of a higher melting point than that of the fitting.

11. A method of forming a joint between two metal pipe lengths each provided with an inner lining of a thermoplastics material, comprising inserting into the one pipe length one end of an electrofusion sleeve with support rings as is defined in claim 1, attaching electrical leads to the electrodes of the coils on the electrofusion sleeve at the end inserted into the pipe end, connecting the leads to a source of electrical power to heat the coils at that end of the electrofusion sleeve to fuse the sleeve to the lining of the pipe, detaching the electrical leads from the electrodes, attaching electrical leads to the electrodes at the opposite end of the electrofusion sleeve, positioning the opposite end of the electrofusion sleeve in the end of a second pipe length, passing the electrical leads along the pipe length, connecting the leads to a source of electrical power to heat the coils at the opposite end of the electrofusion sleeve to fuse the sleeve to the lining of the second pipe length, pulling the electrical leads from the electrodes and removing the leads from within the second pipe, and welding together the adjacent ends of the metal pipes.

12. A method of forming a joint between two metal pipe lengths each provided with an inner lining of a thermoplastics material employing an electrofusion fitting as in defined in claim 1, comprising inserting into the end of one pipe length one end of an electrofusion fitting, introducing into the fitting an expandable mandrel having one or more electrodes on its surface, positioning a mandrel below the heating coils at the said one end of the fitting, expanding the mandrel into contact with the inner surface of the fitting to support the fitting and put the electrodes on the mandrel into contact with the electrodes on the inner surface of the fitting at that side, connecting the electrodes on the mandrel to a source of electrical power, to provide power to heat the at least two coils at the said one end of the fitting, to create at least two electrofused joints between the said one end of the fitting and the thermoplastics lining, locating an expandable mandrel having one or more electrodes on its surface at a position below the other side of the fitting, expanding the mandrel to support the fitting and put the electrodes on the mandrel into contact with the electrodes on the fitting at that side, positioning the fitting in the end of a second pipe length, connecting the electrodes on the mandrel to a source of electrical power to heat the at least two coils at the second end of the fitting to create at least two electrofused joints between the second end of the fitting and the thermoplastics lining of the co-operating lined pipe length, collapsing and withdrawing the mandrel and welding together the adjacent ends of the outer metal pipe lengths.

13. A method of forming a joint between two metal pipe lengths each provided with an inner lining of a thermoplastics material as in claim 12, wherein collapsible and removable mandrels are used.

14. A method of forming a joint between two metal pipe lengths each provided with an inner lining of a thermoplastics material as in claim 12, wherein a single mandrel is used, that can first be collapsed and inserted into the tubular length, and expanded into contact with the inner surface of the tubular fitting, and following welding at that side, the mandrel can be collapsed and withdrawn, and inserted into the other end of the tubular fitting, and re-expanded into contact with the inner surface of the tubular fitting at the end, to facilitate welding at that end, without the risk of collapse of the tubular fitting, followed by collapsing the mandrel again, and withdrawing it from the tubular fitting.

15. A method of forming a joint between two metal pipe lengths each provided with an inner lining of a thermoplastics material as in claim 12, wherein the electrodes on the inner surface of the fitting and on the mandrel are such as to require point contact, with a consequent need for careful location of the mandrel into the fitting and of orienting the mandrel to ensure that its electrodes are aligned with those on the fitting.

16. A method of forming a joint between two metal pipe lengths each provided with an inner lining of a thermoplastics material as in claim 15, wherein the electrodes are elongate around the periphery of the mandrel.

* * * * *